Nov. 6, 1962  A. B. GROSE  3,062,021
DEVICE FOR DISPENSING FROZEN FLUFFY CREAM AND THE LIKE
Filed Dec. 12, 1960  3 Sheets-Sheet 1

INVENTOR.
ANSEL B. GROSE

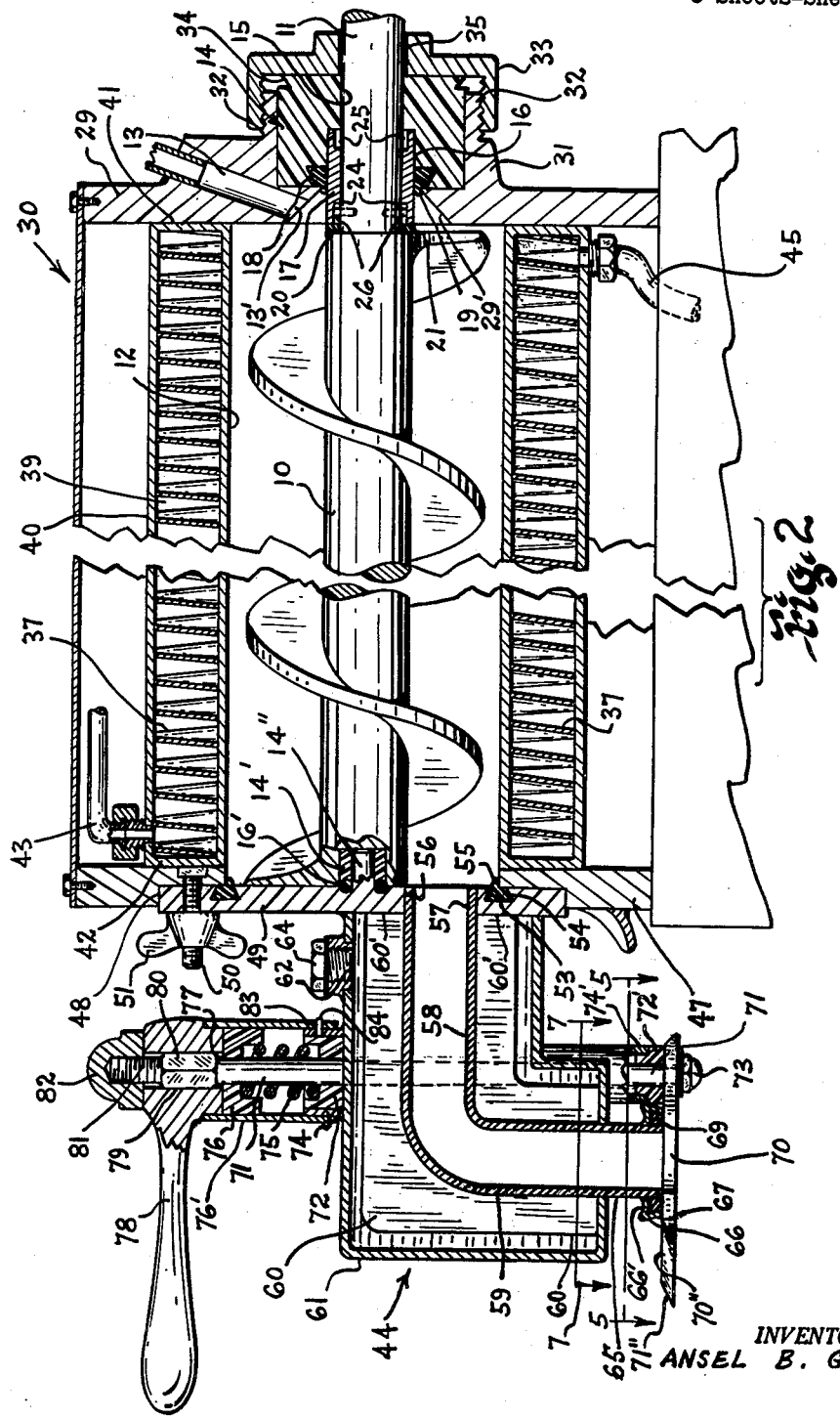

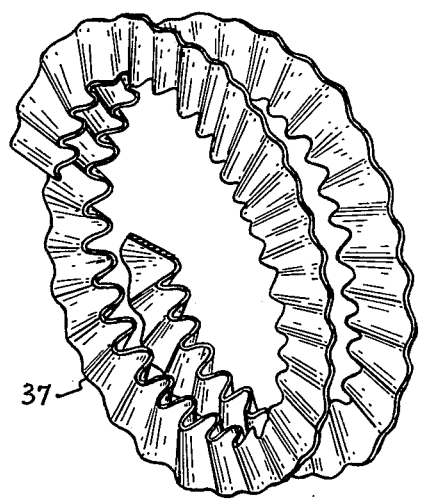
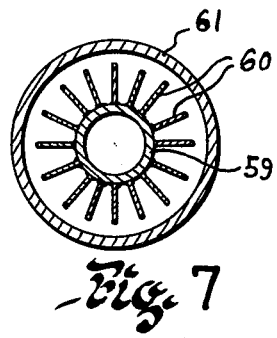
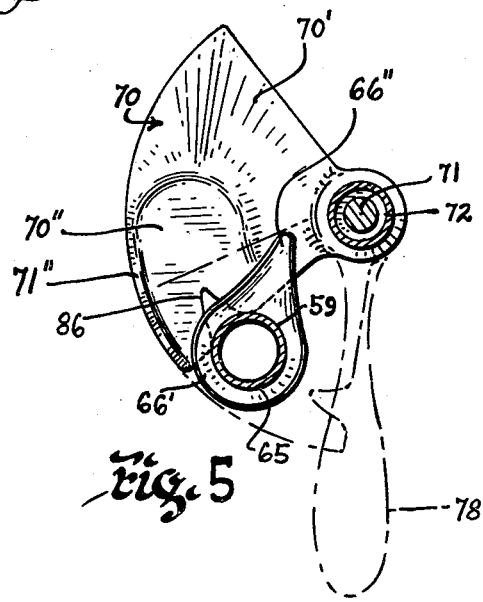
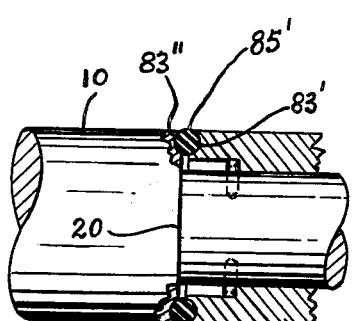
INVENTOR.
ANSEL B. GROSE

United States Patent Office 3,062,021
Patented Nov. 6, 1962

3,062,021
DEVICE FOR DISPENSING FROZEN FLUFFY
CREAM AND THE LIKE
Ansel B. Grose, 8 Mount Vernon St., Stoneham 80, Mass.
Filed Dec. 12, 1960, Ser. No. 75,356
14 Claims. (Cl. 62—342)

This invention relates to improvements in devices for dispensing fluffy frozen ice cream, ice milk, sherbet and like products and has particular reference to the provision of a novel construction of freezing and dispensing unit for such devices.

In the dispensing of frozen products of the above nature, great care has to be exercised that the products be free of contaminants and that the working parts of the dispensing unit be so constructed as to avoid having the mix of such products gain access to isolated areas wherein the mix might be trapped and become high in bacteria and thereby contaminate the products. The fresh product entering the machine and the frozen product leaving the machine should continually pass over all parts of the machine and thereby remove all previous entering product from all parts of the freezing machine.

Another essential feature is that the working parts be so constructed as to not only be sealed against the enrance of the mix therein but so that they may be readily disassembled for periodic cleansing and/or replacement of worn parts.

It has been found, in the past, that great difficulty has been encountered in having the bearing for the auger shaft of such devices rapidly wear or become burred to such an extent as to cause leakage of the mix into or through the bearing. This required frequent replacement which was not only difficult due to the characteristics of such prior art bearings but also was time-consuming and often resulted in contamination of the product or undesired variation of the consistency thereof. In many instances the shaft either had to be turned and retrued, requiring the putting in of a bushing, or had to be completely replaced. In most prior art arrangements such bearings were formed of metal and required continued lubrication. If the machine was required to run 24 hours a day, the addition of lubricant either required the disassembly of the machine or the use of a pressure lubricating system which, if improperly used, as has been experienced in the past, would exert enough pressure back of the lubricant to force it into the mix thereby causing further contamination.

The mixes forming the above frozen products must contain a metered amount of air so as to be of the proper consistency when passing from the freezing unit to the dispensing unit. If leakage takes place as defined above, it allows air to escape thereby causing the mix to become too heavy for proper dispensing and also allows the mix to gain access to isolated locations wherein it may become high in bacteria count and bring about an unsanitary condition.

Another difficulty with prior art devices of this nature has been the time interval required with a certain horsepower machine for reducing the mix to the desired frozen consistency and further to dispense such frozen mixes in a uniformly efficient and sanitary manner. It has been found, with prior art constructions of dispensing valves, particularly, that if the dispensing device remained idle for a considerable length of time the frozen mix in the valve had a tendency to melt, drip and/or become high in bacteria count. This brought about a very undesirable unsanitary condition. It required constant cleansing and the initial drawing of a certain amount of the frozen mix into a so-called "drip pan" from the valve prior to again dispensing such frozen products. The mix in the so-called "drip pan" should be discarded but it has been found, in the past, that due to the cost of the mix and human nature being what it is, in many instances, it was put back in the machine and re-used thus causing a further contamination of the product. A further problem has been the tendency of condensate to form on the dispensing part of the device and which, in the past, was not prevented from getting into the mix or frozen product, and, therefore, was a further source of contamination.

It, therefore, is a principal object of the present invention to overcome all of the above difficulties through the provision of a novel freezing and dispensing unit embodying a self-lubricating non-burring and positively sealed auger shaft bearing which is exceptionally resistant to wear and leakage; through the provision of a novel construction of freezing barrel having improved efficiency of heat transfer which requires less horsepower input for the same freezing effect and which will more positively insure uniform freezing of the mix in a much shorter barrel and shorter time interval than has heretofore been possible, and through the provision of a novel dispensing valve wherein the frozen mix will be indefinitely retained in its frozen state and at the same temperature as the frozen product during long periods of idleness of such dispensing devices and which will maintain said frozen products free from contaminants.

Another object is to provide a self-lubricating auger shaft bearing formed of a mixture of non-toxic resinous material and fibers which are pressed into a solid state wherein the bearing and means for supporting the sealing means are formed into an integral unit.

Another object is to provide a bearing of the above nature formed of lignum vitae or a composition having the characteristics thereof.

Another object is to provide the freezing barrel with a novel construction of heat transfer means through which a coolant may be passed and which will have greatly increased heat-transferring characteristics over known prior art structures of this nature.

Another object is to provide a dispensing valve with novel means for opening and closing the valve and for retaining the frozen product in a frozen state inwardly of said valve for long periods of time and free from contaminants.

Another object is to provide a dispensing valve so constructed as to prevent condensate forming thereon from becoming mixed with the frozen product during the dispensing thereof.

Other objects and advantages of the invention will become apparent from the following description taken in conjunction with the accompanying drawings wherein:

FIG. 2 is an enlarged cross-sectional view of the freezing and dispensing unit embodying the invention;

FIG. 4 is a fragmentary perspective view of the heat transfer means which surrounds the inner cylinder or the barrel;

FIG. 5 is a fragmentary sectional view taken transversely through the dispensing valve.

FIG. 6 is a fragmentary sectional view of a slight modification of the invention; and FIG. 7 is a fragmentary sectional view taken as on line 7—7 of FIG. 2.

Figure 1:
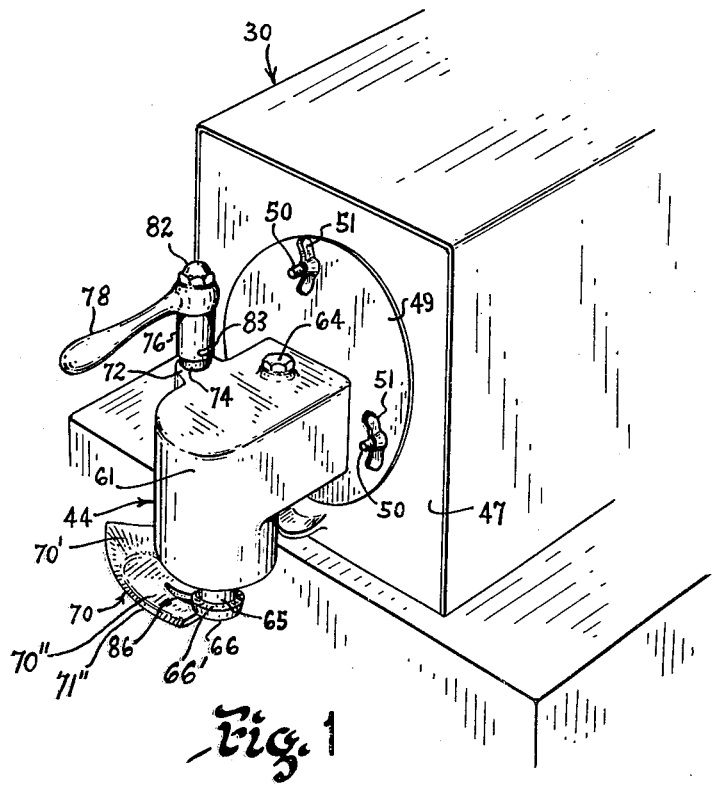
FIG. 1 is a partial front perspective view of the dispensing valve and freezing unit embodying the invention.

Referring more particularly to the drawings, the device embodying the invention comprises the usual conventional type auger 10 having a shaft 11 thereon mounted, in a conventional manner, within a cylindrical barrel 12 into which the mix of the product which is to be dispensed is directed through a passageway 13 which will be later described in more detail. It is to be understood that the auger has the usual scraper blades, not shown, for scraping the frozen mix from the inner walls of the cylinder 12 in a conventional manner. Moreover, with the present construction, the auger shaft 11 extends through a self-lubricating bearing 14 formed of lignum vitae or a plastic manufactured substance such as Teflon or the like or mixture of Teflon and graphite.

The opposite end of the auger shaft is provided with a counterbore in which a bearing 14' of similar material is fitted and which, in turn, fits over a stud 14" which projects inwardly of the inner surface of the door 49. It is pointed out that the inner surface of the door surrounding the stud 14" is slightly recessed to receive an O-ring of sanitary approved rubber or like material 16' which engages within a concave seat in the adjacent end of the bearing 14'. It is to be understood that the O-ring 16' is compressed therein to form a proper seal.

Figure 3:
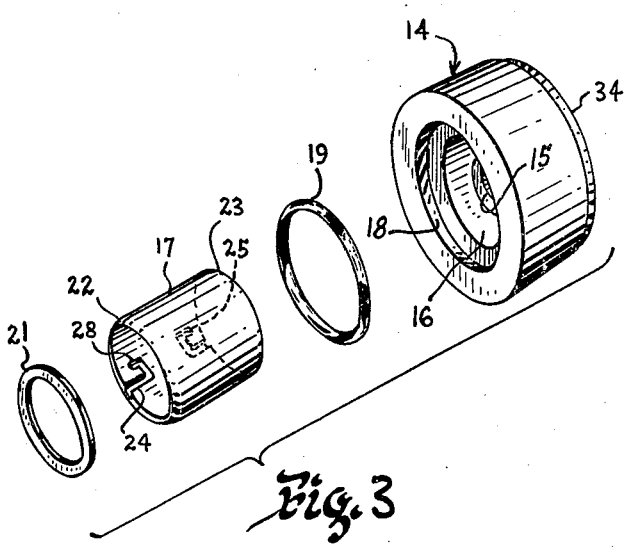
FIG. 3 is an exploded view of the auger shaft bearing and sealing means.

By referring more particularly to FIGS. 2 and 3 it is particularly pointed out that the bearing 14 has a bearing opening 15 therein of a size to relatively intimately receive the shaft 11. The bearing 14 also has a recess 16 therein of a diameter larger than the diameter of the bearing opening 15 communicating with said bearing opening and in which a sleeve 17 is relatively intimately fitted. The bearing 14 further has a counterbore with inwardly diverging side walls 18 into which an O-ring 19 of sanitary approved rubber or like material is fitted about the sleeve 17 and which has a side portion protruding outwardly of said counterbore. The inwardly diverging walls 18 function to retain the O-ring in the counterbore when the parts are disassembled and allows for easy replacement of the O-ring in the machine. The shaft 15 has an enlarged shouldered portion 20 spaced from the inner end of the sleeve 17 and between which a washer, O-ring or the like 21 of rubber or like material is fitted.

The sleeve 17, as shown in FIG. 3, is provided with inwardly tapering ends 22 and 23 whereby it may be easily fitted through the O-ring 19 without danger of injury thereto. The tapered ends permit reversal of the sleeve when desired, so that two wearing or working surfaces are available for the O-ring sealing. Inwardly of the sleeve 17 there is provided a pair of diametrically opposed bayonet slots 24 and 25 adjacent the respective opposite ends thereof which are adapted to receive spaced outwardly extending pins 26 carried by the shaft 11 or many other means of fastening such as a tapered set screw in the middle, a straight key slot in the sleeve with an engaging key in the auger shaft 10, all of which lend themselves best to sanitary and mechanical consideration.

The inwardly angled portions 28 of the respective bayonet slots are so directed as to receive the pins 26 therein when the shaft is rotated in its prescribed direction of rotation whereby the sleeve will be locked onto said shaft against longitudinal movement thereon and will be adapted to rotate with said shaft. The rear side wall 29 of the main housing 30 of the freezing unit is provided with a hollow protuberance 31 having an internal dimension such as to intimately receive the bearing 14 therein and in concentric relation with the axis of the shaft 15 and is provided with a threaded outer portion 32 adapted to receive an inwardly threaded cap nut 33.

It is pointed out that the bearing 14 has a notched end 34 which extends outwardly of the hollow protuberance 31 and which is adapted to be engaged by the cap nut 33 when said cap nut is tightened. The cap nut is further provided with an opening 35 through which the shaft 11 is adapted to extend so as to permit tightening of the nut independently of the shaft. When the cap nut is tightened, it forces the bearing 14 inwardly so as to compress the O-ring 19 against the base of the hollow protuberance 31 and further forces said O-ring into intimate sealed relation with the sleeve 17 to provide a liquid and air seal between said bearing and the base of the hollow protuberance. Inward movement of the bearing 14, in response to the tightening of the cap nut 33, also forces the sleeve 17 inwardly against the resilient washer or the like 21 to provide an air and liquid seal between the shouldered portion 20 of the shaft and the adjacent end of the sleeve 17 thereby providing a tight seal at this end of the shaft to prevent leakage of air and/or mix into the bearing. Further, the turning of the auger shaft in the frozen product forces the product to the front. This, in turn, forces the inner end of the auger shaft back toward the sleeve on the auger shaft causing the shoulder to press agains the O-ring between it and the sleeve thereby causing it to seal tightly against the mix thus preventing leakage under the sleeve.

With the present construction the freezing cylinder 12 is surrounded by a ribbon-like spiral coil 37 of copper or the like which is corrugated to produce fins having increased heat-transferring characteristics in a restricted area, a portion of which is shown in perspective in FIG. 4. The said fins are spaced approximately 1/30 of an inch apart between the respective high spots of the corrugations of adjacent fins and extend throughout the length of and are secured to the outer surface of the freezing cylinder 12 by electro-copper plating thus giving perfect contact with the stainless steel barrel or cylinder 12. The previous methods of attaching were by soldering, welding or the like. This increased the resistance to heat transfer and caused slower freezing and in some instances set up internal stresses in the barrel which caused blisters or splitting to occur from 1 to 12 months after manufacture. In the present instance, the corrugated fins are attached to the barrel by first winding the fins onto the barrel. The fins are held at their ends on the barrel by clamp blocks and the electro-copper plating is then carried out. This not only coats the fins and barrel but attaches the fins to the barrel and provides greatly increased heat transfer or flow. The corrugations of the fins are wider and are more closely formed adjacent the inner edge of said fins than at the outer edge thereof thereby increasing the area of contact therewith thereof with the cylinder or barrel to enhance their heat-transferring characteristics. The fins lie within a sealed space 39 between the outer walls of the cylinder or barrel 12 and an outer wall 40 which is not secured to said fins but is in adjacent relation with the outer edges thereof. The opposed ends of the cylinder or barrel 12 and the outer wall 40 are sealed off by end walls 41 and 42 respectively.

A liquid refrigerant of known type is directed into one end of the sealed space 39 through a passageway 43 and is adapted to flow throughout a spiral path between the corrugated fins 37 longitudinally of the cylinder or barrel 12 and to thereafter flow outwardly of an outlet 45 to cause the mix to freeze in said cylinder or barrel within a relative short time interval thereby permitting the barrel to be formed shorter than conventional barrels. It is to be understood that the frozen mix is forced outwardly of the barrel by the auger 10 in a conventional manner and through the dispensing valve 44. The refrigerant may comprise a chemical composition $CCl_2F_2$ or may be any one of the commonly known refrigerants.

The front wall 47 of the housing 30 is provided with a shouldered recess 48 into which a metallic door 49 is fitted. The door is securely held in said shouldered recess by a plurality of bolts 50 having suitable tightening wing nuts or the like 51 thereon, see FIGS. 1 and 2. The inner side surface of the door 49 is provided with a circumferential groove 53 in which an O-ring of rubber or the like 54 is positioned and which is adapted to be pressed against the adjacent side surface or base of the shouldered recess 48 when the door is tightened in position to provide a tight seal therebetween. The groove 53 is located at the very edge of the inner wall of the barrel 12 so that there is no chance of a small amount of mix to trap and become high in bacteria count thus contaminating the product. The O-ring is preferably half in and half out of the barrel 12.

It is particularly pointed out that the circumferential groove and O-ring 54 are located adjacent the inner edge surface 55 of an opening in the front wall of the housing and which is of a diameter substantially equal to the inner diameter of the cylinder or barrel 12 so as to provide an immediate seal against leakage of air or liquid at said location.

The door 49 is provided with an opening 56 into which the end 57 of a hollow metallic tube 58 is fitted and secured by welding, soldering or the like. The tube has an angled metallic tubular portion 59 which, together with said tube produces an outlet or passageway for the frozen mix of the product to be dispensed. The said tube 58 and angled portion 59 are provided with closely spaced peripheral copper fins 60 which are disposed longitudinally of and radial with the axis of the passageway as shown in FIGS. 2 and 7. The fins are preferably formed of copper and are attached to the tubular sections 58 and 59 which form the passageway by electro-plating for better heat transfer and to prevent internal stresses which might be caused if they were attached by soldering or welding. It is further to be understood that the inner ends 60' of the fins are attached to the face plate or door 49 which acts as heat transfer means whereby the fins will be maintained at a low temperature by the frozen mix in the barrel. The tube section 58 and angled portion 59 must be made of stainless steel for sanitary reasons and the fins are preferably formed of copper but may be of any other suitable metal. Surrounding said fins, tubular section 58 and angled portion 59 is a sealed casing 61 into which a refrigerant may be placed through an inlet 62. The said refrigerant and fins are adapted to keep the frozen mix in said frozen state inwardly of the tubular section 58 and angled portion 59 and ready to be dispensed at all times.

The refrigerant is maintained in a cold state by the heat-transferring characteristics of the door 49 and fins 60 from the frozen mix in the barrel. The inlet 62 is sealed by a suitable cap bolt 64. The angled outlet portion 59, as shown at 65, protrudes outwardly of the sealed casing 61 and is provided adjacent its lower end with an open-faced metallic ring 66 having an inwardly diverging inner wall 67 adapted to receive an O-ring 69 of rubber or like material. The open-faced ring 66 is secured to said end by welding or soldering and has its outer edge lying in the plane of the end of the protruding portion 65 and is adapted to be engaged by a metallic valve plate 70 secured to the lower end of a valve shaft 71.

It has been found with prior art devices that condensate will form on the outer surface of the dispensing spigot such as the protruding portion 65 during the use of such devices. In the present instance, the open faced ring 66 is provided with a channel 66' on the upper side thereof into which such condensate may flow. The channel 66' as shown in FIG. 5 is provided with a drain lip 66" by means of which the condensate may flow outwardly of the channel down onto the valve plate 70. The valve plate 70 is provided with a drip lip 66" which has its outlet preferably located adjacent the pivot shaft 71 and overhangs an outwardly and downwardly beveled portion 70' formed on said valve plate 70. This causes the condensate to pass outwardly of the channel 66' through the drain lip 66" onto the angled portion 70' of the valve plate whereby it will drip clear of the frozen mix.

It is pointed out that the valve plate 70 is provided with a relatively flat raised area 70" which engages the lower end of the outlet 59 to seal off the flow of the frozen mix when the flat raised area 70" is positioned in overlying relation with the angled outlet portion 59.

It is further pointed out that the valve plate is angled at 71" relative to the raised area 70" to further insure against the condensate flowing upwardly onto said area 70". This prevents the condensate from mixing with the frozen mix as it is dispensed and thereby prevents the contamination thereof by said condensation.

The valve shaft 71 lies within a bearing 72 located inwardly of a tubular protuberance 74 formed on the side of the sealed casing 61. The shaft 71 extends upwardly through another bearing 76 where it is located inwardly of a sleeve 76' which is secured to a shouldered projection 77 formed on the valve handle 78. The bearings 72 and 76 are formed of a material similar to the material of the bearings 14 and 14', respectively. The said sleeve 76' has its lower end in telescoping relation with the tubular protuberance 74. The bearings 72 and 76, respectively, are provided with facing counterbores in which the respective ends of a coil spring 75 extend. The coil spring 75 is in surrounding relation with the shaft 71. The valve shaft 71 extends downwardly through a bearing 72' encased within the lower reduced end of a tubular member 74' which is a continuation of the tubular protuberance 74 and which is secured to the side of the casing 61. The shaft 71 extends downwardly through an opening in the valve plate 70 and is provided with a threaded end onto which a suitable nut or the like 73 is threaded to attach the plate to said shaft 71. The bearing 72' is formed of a material similar to the bearings 72 and 76 and which are all of the self-lubricating types similar to the bearings 14 and 14'.

The valve handle 78 is provided with a square aperture 79 adapted to fit over a square portion 80 formed adjacent the upper end of the shaft 71. The sleeve 76' is preferably secured to the protuberance 77 by soldering, welding or the like so as to turn therewith. The upper end of the shaft 71 is provided with a threaded portion 81 adapted to receive a nut 82 which secures the handle on the shaft. When the nut 82 is tightened it will force the end of the valve handle 78 having a square aperture therein downwardly against the coil spring 75 which will, in turn, draw the plate 70 upwardly against the lower end of the angled portion 59 and against the O-ring 69. The valve handle 78 and its associated mechanism may be placed on either side of the housing 61 as desired.

The plate 70, as shown in FIG. 5 is adapted to be turned in a sidewise direction so as to open or close the lower end of the angled portion 59 to allow the dispensing of the frozen mix and the shutting off thereof. It is pointed out that the plate is never moved to a position whereby it will be disengaged from the O-ring 69. This is controlled by the provision of a suitable stop slot 83 and pin 84, which will limit the movement of said plate to either open or closed position. The plate is preferably provided with a slotted portion 85 which when the plate is being moved to closed position will allow a slight amount of the frozen product to be discharged through siad slot prior to the moving of said plate to fully closed position. This forms a so-called "tail" or "curl" on the top of the dispensed frozen product.

Instead of placing a refrigerant in the sealed casing 61, it is to be understood that a vacuum may be drawn and maintained within said casing so as to act as a thermal seal for maintaining the dispensing valve at a low temperature.

In FIG. 6 there is shown a slight modification wherein the sleeve 17 is provided with a circumferential groove 83' in the end thereof and the shouldered portion 20 of the auger shaft 10 is also provided with a circumferential groove 83". Inwardly of said grooves there is positioned an O-ring 85' which is adapted to be compressed between the circumferential grooves 83' and 83", respectively, when the cap nut 23 is tightened in such manner as to protrude slightly outwardly of the outer edges of said respective grooves so as to form a tight seal at said location. This prevents any mix from gaining access to the interior of the sleeve 17 and functions in a manner similar to the sealing ring 21 in FIG. 2.

It is pointed out that the inner side of the rear side wall 29 is tapered inwardly at 29' to an inner edge spaced approximately 1/16" from the adjacent surface of the sleeve 17, as shown in FIG. 2, whereby a portion of the O-ring 19 is adapted to protrude slightly through said spacing when the cap nut 33 is tightened as previously described above. This insures a positive seal against the mix entering between the sleeve 17 and the bearing 14.

It is further pointed out that the passageway 13 is so angled as to have its open end 13' extending through the outwardly angled portion 29' of the rear side wall 29 in overlying relation with the sleeve 17 whereby the mix directed through said passageway will be directed onto said sleeve and thence into the barrel to be frozen and to be forced outwardly by the rotating auger. It is pointed out that the sealing rings 19 and 21 positively prevent the mix from gaining access into the interior of the sleeve 17 or bearing 14 and thereby insures that none of the mix is trapped at said location.

From the foregoing description it will be seen that a simple, efficient and novel construction of frozen mix dispensing device has ben provided for accomplishing all of the objects and advantages of the invention and it is to be understood that various details of construction are shown and described only by way of illustration of the invention and are not to be interpreted in a limiting sense.

Having described my invention, I claim:

1. A frozen product dispensing device comprising the combination of a barrel, an auger rotatably mounted in said barrel, a sealed chamber in surrounding relation with said barrel, spirally disposed corrugated fins secured to the outer surface of said barrel and extending throughout the major portion of the length thereof and throughout the major width of the sealed chamber, a liquid refrigerant inlet adjacent one end of said chamber and an outlet adjacent the opposed end thereof whereby liquid refrigerant may be circulated spirally between said corrugated fins, said barrel being positioned within a housing having a wall on the rear side thereof closing said end of said barrel, said wall having an opening therein and a hollow rearwardly extending protuberance substantially concentric with the opening in said wall, said auger having a shouldered portion adjacent the inner surface of said rear wall and a reduced shaft portion extending outwardly of said opening, a sleeve surrounding said reduced shaft portion and being of a diameter substantially equal to that of the diameter of the opening in said rear wall, said sleeve having diametrically opposed bayonet slots inwardly of the end thereof adjacent said shouldered portion of the shaft, pins mounted on said shaft communicating with said bayonet slots, a sealing ring between said shouldered portion and the adjacent end of said sleeve, a bearing fitted within said hollow portion of said protuberance and having a counterbore into which the opposed end of said sleeve extends, said bearing having a circumferential groove in the end thereof overlying said sleeve formed with inwardly diverging side walls, an O-ring of resilient material fitting within said circumferential groove and adapted to engage said sleeve and the outer surface of said side wall within said protuberance, said bearing being of a length such as to protrude outwardly beyond the outer end of the protuberance, said protuberance having an outer threaded portion, a cap nut having a central opening therein through which said reduced portion of said shaft extends and having an inwardly threaded portion threadedly connected with the threaded portion of the protuberance and being adapted when tightened to force the O-ring in said circumferential groove of the bearing into sealed relation with the adjacent surface of said rear wall and with said sleeve and to simultaneously force said sleeve toward said shouldered portion to exert a pressure on the sealing ring of resilient material between the adjacent end of said sleeve and said shouldered portion to provide a permanent seal therebetween, said housing having a front wall adapted to close the front end of said barrel, said front wall having an opening therein of a diameter substantially equal to the inner diameter of the barrel and having a shouldered recess in the front surface thereof, a door secured within said shouldered portion, said door having an inner circumferential groove of a diameter slightly larger than the inner diameter of the opening in said front wall, an O-ring of resilient material positioned within said circumferential groove, means for securing said door to said front wall and to bring about a seal between said O-ring and the adjacent inner surface of the front wall portion, said door having an opening therein below the auger shaft, a tubular passageway leading from said opening outwardly to an integral downwardly angled tubular passageway secured to the adjacent end of said first tubular passageway, spaced fins surrounding the outer surfaces of said passageways, a sealed chamber surrounding said passageways and fins, said angled tubular passageway having an end portion extending downwardly below said sealed chamber, an open sided ring secured to the lower end of said downwardly extending end portion having its free edge in substantially flush relation with the lower end of said downwardly extending end portion, an O-ring fitted within said open sided ring, a bearing to one side of said sealed chamber, a shaft in said bearing, a valve plate secured to the lower end of said shaft and adapted to overlie the lower open end of said downwardly extending portion of the passageway in engagement with said last named O-ring, means for resiliently retaining said valve plate in clamping engagement with said lower open end and with said last named O-ring and a handle secured to the upper end of said shaft whereby said valve plate may be moved to open or closed position with respect to said open lower end.

2. A frozen product dispensing device comprising the combination of a barrel, an auger rotatably mounted in said barrel, a sealed chamber surrounding said barrel, spirally disposed fins secured to the outer surface of said barrel in adjacent spaced relation with each other and extending throughout the major portion of the length of said barrel and throughout the major width of the sealed chamber, a liquid refrigerant inlet adjacent one end of said chamber and an outlet adjacent the opposed end thereof whereby said liquid refrigerant may be circulated spirally between said fins, said barrel being positioned within a housing having a perforated wall on the rear side thereof which closes said end of said barrel and a hollow protuberance substantially concentric with said opening in said wall, said auger having a shouldered portion adjacent the inner surface of said rear wall and a reduced shaft portion extending outwardly of said opening, a sleeve surrounding said reduced shaft portion and being of a diameter substantially equal to that of the diameter of the opening in said rear wall, said sleeve having diametrically opposed bayonet slots inwardly of the end thereof adjacent said shouldered portion of the shaft, pins mounted on said shaft communicating with said bayonet slots, a sealing ring between said shouldered portion and the adjacent end of said sleeve, a bearing fitted within said hollow portion of said protuberance and having a counterbore into which the opposed end of said sleeve extends and having a circumferential groove in the end thereof overlying said sleeve, an O-ring of resilient material fitting within said circumferential groove and adapted to engage said sleeve and the outer surface of said side wall within said protuberance, said bearing being of a width such as to protrude outwardly beyond the outer end of the said protuberance, said protuberance having an outer threaded portion, a cap nut having a central opening therein through which said reduced portion of said shaft extends and having an inwardly threaded portion threadedly connected with the threaded portion of the protuberance and being adapted when tightened to force the O-ring in said circumferential groove of the bearing into sealed relation with the adjacent outer surface of said rear wall and with said sleeve and to simultaneously force said sleeve toward said shouldered portion to exert a pressure on the sealing ring of resilient material between the adjacent end of said sleeve and said shouldered portion to provide a permanent seal therebetween, the front wall of said housing being adapted to close the front end of said barrel, said front wall having an inner circumferential groove therein, an O-ring of resilient material positioned within said circumferential groove to bring about a seal between said front wall and the adjacent surface of the barrel, said front wall having an opening therein below the auger shaft, a tubular passageway leading from said opening outwardly to an integral downwardly angled tubular passageway portion secured to said first tubular passageway, spaced fins surrounding the outer surfaces of said passageways, a sealed chamber surrounding said passageways and fins, said angled tubular passageway having an end portion extending downwardly below said sealed chamber, an open sided ring secured to the lower end of said downwardly extending end portion, an O-ring fitted within said open sided ring, a bearing to one side of said sealed chamber, a shaft in said bearing, a valve plate secured to the lower end of said shaft and adapted to overlie the open end of said downwardly extending portion of the passageway and means for resiliently retaining said valve plate in clamping engagement with said lower end of said passageway and means for moving said valve plate to open or closed position with respect to said downwardly extending end of said angled passageway.

3. A frozen product dispensing device comprising the combination of a barrel into which a liquid mix to be frozen may be directed, said barrel having front and rear walls each provided with bearing means, a rotatable auger supported in said barrel by said bearing means, an opening in said front wall of said barrel having a passageway extending outwardly and downwardly thereof, a plurality of radially disposed spaced fins surrounding and extending longitudinally of said passageway, each having its innermost end secured to the outer side surface of said front wall, a sealed chamber carried by said front wall in surrounding relation with said fins, refrigerating means within said sealed chamber, and valve means for opening and closing said downwardly extending portion of said passageway for dispensing controlled amounts of a frozen mix which is adapted to be forced outwardly of said barrel through said passageway by rotation of said auger when said valve is open.

4. A frozen product dispensing device comprising the combination of a barrel into which a liquid mix to be frozen may be directed, said barrel having front and rear walls each having aligned bearing means therein, an auger rotatably supported in said barrel by said bearing means, said barrel having a sealed chamber in surrounding relation therewith, closely related spirally wound corrugated fins extending throughout the major portion of the length of said barrel and secured throughout the inner edges thereof to the outer surface of said barrel within said chamber and through which a refrigerant is directed, said front wall of said barrel having an opening therein, a tubular member extending outwardly and downwardly of said opening, a plurality of spaced longitudinally extending fins surrounding said tubular member in radial relation therewith and having their inner ends secured to the outer side of said front wall, a sealed chamber surrounding said fins, means within said sealed chamber functioning cooperatively with said fins for maintaining said tubular member in a cold state, and valve means for opening and closing said tubular member for dispensing frozen mix which is adapted to be forced outwardly of said barrel through said tubular member by rotation of said auger when said valve is open.

5. A frozen product dispensing device comprising the combination of a barrel into which a liquid mix to be frozen may be directed, means associated with said barrel for freezing the mix in said barrel, said barrel having a rotatable auger therein and having bearing means for rotatably supporting said auger, an opening in the front side of said barrel having a passageway extending outwardly and downwardly thereof, a plurality of spaced fins surrounding and extending radially longitudinally of said passageway and each having an inner end secured to the front side of said barrel, a sealed chamber surrounding said fins, refrigerating means within said sealed chamber functioning cooperatively with said fins to maintain said passageway in a cold state, and valve means for opening and closing said passageway for dispensing frozen mix which is adapted to be forced outwardly of said barrel through the passageway by rotation of said auger when said valve is open.

6. A frozen product dispensing device comprising the combination of a freezing barrel into which a mix to be frozen may be directed, a rotatable auger in said barrel, a rear wall portion having an opening therein, said wall portion being in sealed relation with the rear of said barrel, a hollow protuberance having a threaded outer end extending outwardly of said rear wall in substantially concentric relation with said opening, said auger having a shouldered portion and a reduced shaft portion extending outwardly of said opening and of said hollow protuberance, a sleeve on said reduced shaft portion relatively intimately fitting within the opening in said rear wall, said sleeve having diametrically opposed bayonet slots on its inner sides adjacent one end thereof, pins carried by said reduced shaft portion fitting within said bayonet slots and adapted to interlock therewith in the direction of rotation of said shaft, a sealing ring between said shouldered portion and the adjacent end of said sleeve, a bearing fitted within said hollow protuberance and having an end portion extending outwardly thereof, said bearing having a counterbore into which the opposed end of said sleeve is fitted and having a bearing opening therein coaxial with the axis of the reduced shaft portion and of a diameter to intimately fit said reduced shaft portion, the inner side of said bearing portion having a circumferential groove therein with inwardly diverging side wall portions, an O-ring in said circumferential groove, a cap nut threadedly connected with the outwardly threaded portion of said protuberance and having an opening therein through which the reduced shaft portion extends, said cap nut, when tightened, being adapted to exert a pressure on said bearing portion and to, in turn, force the O-ring into sealed relation with the adjacent outer side surface of said rear wall and to simultaneously force the sealing ring in sealed relation with the shouldered portion and the adjacent end of the sleeve, a liquid dispensing valve adjacent the opposed end of said freezing barrel having a passageway through which the frozen mix in said barrel may be forced by rotation of said auger and means for opening and closing said valve for dispensing controlled amounts of said frozen mix.

7. A frozen product dispensing device comprising the combination of a freezing barrel into which a mix to be frozen may be directed, a rotatable auger in said barrel, said freezing barrel having a rear wall portion with an opening therein and having a hollow protuberance with a threaded outer end extending outwardly of said wall in substantially concentric relation with said opening, said auger having a shouldered portion and reduced shaft portion extending outwardly of said opening and of said hollow protuberance, a sleeve on said reduced shaft portion relatively intimately fitting within the opening in said rear wall, said sleeve having an inwardly tapered end and diametrically opposed bayonet slots on its inner sides adjacent its opposite end, pins carried by said reduced shaft portion fitting within said bayonet slots and adapted to interlock therewith in the direction of rotation of said shaft, a sealing ring between said shouldered portion and the adjacent end of said sleeve, a bearing fitted within said hollow chamber and having an end portion extending outwardly thereof, said bearing having a counterbore into which the tapered end of said sleeve is fitted and having a bearing opening therein of a diameter to intimately fit said reduced shaft portion, the inner side of said bearing portion having a circumferential groove therein, an O-ring in said circumferential groove, a cap nut threadedly connected with the outwardly threaded portion of said protuberance and having an opening therein through which the reduced shaft portion extends, said cap portion when tightened being adapted to exert a pressure on said bearing portion and to, in turn, force the O-ring into sealed relation with the outer side surface of said rear side wall and to simultaneously force the sealing ring in sealed relation with the shouldered portion and the adjacent end of the sleeve, a liquid dispensing valve adjacent the opposed end of said barrel portion having a passageway through which the frozen mix in said barrel portion may be forced by rotation of said auger and means for opening and closing said passageway for dispensing said frozen mix.

8. A frozen product dispensing device comprising the combination of a barrel into which a liquid mix to be frozen may be directed, means associated with said barrel for freezing the mix in said barrel, said barrel having a rotatable auger therein and having bearing means for rotatably supporting said auger, an opening in the front side of said barrel having a passageway with an open end extending outwardly and downwardly thereof, said open end of said passageway having means externally thereof and in surrounding relation therewith provided with a channel for receiving and directing condensate which may form on the exterior of the passageway away from said passageway and valve means for dispensing frozen mix which is adapted to be forced outwardly of said barrel through the open end of the passageway, said valve means comprising a plate having a raised portion movable to open and closed positions relative to said open end of said passageway and further having an outwardly and downwardly angled portion adjacent said raised portion for receiving condensate from said channelled means and for directing it away from said raised portion.

9. A frozen product dispensing device comprising the combination of a metallic barrel into which a mix to be frozen may be directed, said barrel being surrounded by a sealed chamber, normally disposed spirally wound closely spaced metallic corrugated ribbon-like fins secured at their inner edges by a plating metal onto the outer side of said barrel and extending throughout the major portion of the length thereof inwardly of said chamber and throughout the major portion of the width of said chamber, means for directing a refrigerant through said spaced fins, a rotatable auger in said barrel, bearing means on said barrel for rotatably supporting said auger adjacent the rear side thereof, an opening in the front side of said barrel having a passageway extending outwardly thereof, and valve means for opening and closing said passageway for dispensing frozen mix adapted to be forced outwardly of said barrel through the passageway by rotation of said auger.

10. A frozen product dispensing device comprising the combination of a freezing barrel into which a mix to be frozen may be directed, a rotatable auger in said barrel, said freezing barrel having a rear wall portion with an opening therein and having a hollow protuberance with a threaded outer end extending outwardly of said wall in substantially concentric relation with said opening, said auger having a shouldered portion and a reduced shaft portion extending outwardly of said opening and into said hollow protuberance, a sleeve on said reduced shaft portion relatively intimately fitting within the opening in said rear wall, said sleeve havng means for connecting the same to said reduced shaft portion, a seal-ing ring between said shouldered portion and the adjacent end of said sleeve, a bearing fitted within said hollow chamber and having an end portion extending outwardly thereof, said bearing having a counterbore into which the adjacent end of said sleeve is fitted and having a bearing opening therein of a diameter to intimately fit said reduced shaft portion, the inner side of said bearing portion having a circumferential groove therein, an O-ring in said circumferential groove, a cap nut threadedly connected with the outwardly threaded portion of said protuberance and having an opening therein through which the reduced shaft portion extends, said cap portion when tightened being adapted to exert a pressure on said bearing portion and to, in turn, force the O-ring into sealed relation with the outer side surface of said rear side wall and to simultaneously force the sealing ring in sealed relation with the shouldered portion and the adjacent end of the sleeve, a dispensing valve adjacent the opposed end of said barrel portion having a passageway through which the frozen mix in said barrel portion may be forced by rotation of said auger and means for opening and closing said passageway for dispensing said frozen mix.

11. A frozen product dispensing device comprising the combination of a barrel into which a liquid mix to be frozen may be directed, said barrel having a rotatable auger therein and having self-lubricating bearing means for rotatably supporting said auger, said barrel having a sealed chamber in surrounding relation therewith, spirally wound closely spaced corrugated ribbon-like metallic fins secured throughout their inner edges to the outer surface of said barrel and extending throughout the major portion of the length of said barrel within said chamber and through which a refrigerant is directed between said spaced fins, said barrel having an opening in the front side thereof, a tubular member extending outwardly and downwardly thereof, a sealed chamber surrounding said tubular member, means in the form of longitudinally disposed radial fins on said tubular member within said sealed chamber and functioning in combination with a refrigerant in said chamber for maintaining said tubular member in a cold state, and valve means for opening and closing said tubular member for dispensing frozen mix which is adapted to be forced outwardly of said barrel through said tubular member by rotation of said auger when said valve is open.

12. A frozen product dispensing device comprising the combination of a barrel into which a liquid mix to be frozen may be directed, means associated with said barrel for freezing the mix in said barrel, said barrel having a rotatable auger therein, bearing means carried by said barrel for rotatably supporting said auger, said barrel having a front wall with an opening therein, a passageway extending outwardly and downwardly from said opening, a plurality of spaced longitudinally disposed radial fins secured to and surrounding said passageway and each having an end thereof secured to said front wall, a sealed chamber surrounding said fins, refrigerating means within said sealed chamber functioning cooperatively with said fins to maintain said passageway in a cold state, and valve means for opening and closing said passageway for dispensing frozen mix which is adapted to be forced outwardly of said barrel through the passageway by rotation of said auger when said valve is open.

13. A frozen product dispensing device comprising the combination of a hollow barrel into which a mix to be frozen may be directed, said barrel comprising spaced inner and outer walls secured in sealed relation with each other at their opposite ends by solid walls straddling said ends, a corrugated metallic ribbon spirally wound in continuous closely spaced substantially radially disposed fins internally of said spaced inner and outer walls, said corrugations being wider and more closely formed at the inner edges of said fins, said fins being secured at said inner edges to the inner surface of the inner side wall of the barrel and extending through the major portion of the length of said barrel and extending throughout the major portion of the width of the space between said side walls, means for directing a refrigerant through said spaced fins, a rotatable auger internally of said barrel, closure means at one end of said barrel having bearing means therein for rotatably supporting said auger, a closure member at the opposite end of said barrel having a passageway extending outwardly thereof and valve means for opening and closing said passageway for dispensing frozen mix adapted to be forced outwardly of said barrel through the passageway by rotation of said auger.

14. A frozen product dispensing device comprising the combination of a barrel into which a liquid mix to be frozen may be directed, said barrel comprising spaced cylindrically shaped metallic inner and outer side walls secured in sealed relation with each other at their opposite ends by solid walls straddling said ends, a corrugated metallic ribbon spirally wound in continuous closely spaced substantially radially disposed fins internally of said spaced inner and outer walls, said corrugations being wider and more closely formed at the inner edges of the fins, said fins being secured at said inner edges to the inner surface of the inner side wall of the barrel and extending throughout the major portion of the length of said barrel and extending throughout the major portion of the width of the space between said side walls, means for directing a refrigerant through said spaced fins, a rotatable auger internally of said barrel, closure means at one end of said barrel having bearing means therein for rotatably supporting said auger, a closure member at the opposite end of said barrel having a passageway extending outwardly thereof and valve means associated with the free end of the passageway for dispensing frozen mix which is adapted to be forced outwardly of said barrel through said free end, said valve means comprising a plate movable to a position to overlie the end of and to close said passageway and to a position to one side of said passageway to open the same, said end of the passageway having a channel surrounding the same with its open side facing the plate and an O-ring of resilient material in said channel having a side edge thereof extending outwardly of the channel and in frictional sealed relation with said plate when it is in closed position.

References Cited in the file of this patent

UNITED STATES PATENTS

| | | |
|---|---|---|
| 2,000,730 | Wortman | May 7, 1935 |
| 2,210,366 | Godfrey | Aug. 6, 1940 |
| 2,535,462 | Stoelting | Dec. 26, 1950 |
| 2,590,499 | Braswell | Mar. 25, 1952 |
| 2,604,307 | Swenson | July 22, 1952 |
| 2,608,833 | Woodruff | Sept. 2, 1952 |
| 2,698,162 | Riesgo | Dec. 28, 1954 |
| 2,784,946 | Zydycryn | Mar. 12, 1957 |
| 2,819,731 | Louthan | Jan. 14, 1958 |
| 2,949,748 | Gangi | Aug. 23, 1960 |

FOREIGN PATENTS

| | | |
|---|---|---|
| 106,629 | Australia | Mar. 2, 1939 |